(12) United States Patent
Lee

(10) Patent No.: US 8,136,970 B2
(45) Date of Patent: Mar. 20, 2012

(54) APPARATUS AND METHOD FOR CONTROLLING HEAD LAMP

(75) Inventor: Hong Gon Lee, Siheung-si (KR)

(73) Assignee: LG Innotek Co., Ltd., Seoul (KR)

( * ) Notice: Subject to any disclaimer, the term of this patent is extended or adjusted under 35 U.S.C. 154(b) by 297 days.

(21) Appl. No.: 12/374,044

(22) PCT Filed: Mar. 14, 2008

(86) PCT No.: PCT/KR2008/001445
§ 371 (c)(1),
(2), (4) Date: Jan. 15, 2009

(87) PCT Pub. No.: WO2008/114960
PCT Pub. Date: Sep. 25, 2008

(65) Prior Publication Data
US 2009/0323367 A1   Dec. 31, 2009

(30) Foreign Application Priority Data

Mar. 16, 2007 (KR) .................. 10-2007-0026159
Mar. 5, 2008 (KR) .................. 10-2008-0020494

(51) Int. Cl.
*F21V 21/28* (2006.01)
*B60Q 1/00* (2006.01)

(52) U.S. Cl. .................. 362/465; 362/467; 362/526

(58) Field of Classification Search .......... 362/464–469, 362/523–526, 529–532, 285, 286, 418, 419
See application file for complete search history.

(56) References Cited

U.S. PATENT DOCUMENTS

| 4,858,080 A * | 8/1989 | Oikawa ................ 362/466 |
| 4,967,319 A * | 10/1990 | Seko .................. 362/466 |
| 6,389,344 B1 * | 5/2002 | Nishimura et al. ........ 362/460 |
| 6,547,425 B2 * | 4/2003 | Nishimura .............. 362/466 |
| 6,924,616 B2 * | 8/2005 | Yamamoto et al. ......... 318/685 |
| 2004/0212341 A1 | 10/2004 | Yamamoto et al. |
| 2005/0052879 A1 | 3/2005 | Bahnmuller et al. |
| 2005/0122726 A1 | 6/2005 | Yamamoto et al. |

FOREIGN PATENT DOCUMENTS

| KR | 10-1997-0037422 | 7/1997 |
| KR | 10-2004-0046090 | 6/2004 |
| KR | 10-2007-0005386 | 1/2007 |

* cited by examiner

*Primary Examiner* — Bao Q Truong
(74) *Attorney, Agent, or Firm* — Saliwanchik, Lloyd & Eisenschenk

(57) ABSTRACT

Disclosed is an apparatus for controlling a head lamp. The apparatus comprises: a lamp electronic control unit for generating a lamp steering signal according to a received steering angle and speed information; first and second head lamp control sections for generating motor driving signals corresponding to the lamp steering signal; and first and second step actuators for rotating first and second head lamp modules at predetermined angles by converting a rotational movement of a motor into a linear movement according to the motor driving signals of the first and second head lamp control modules.

18 Claims, 3 Drawing Sheets

[Fig. 1]
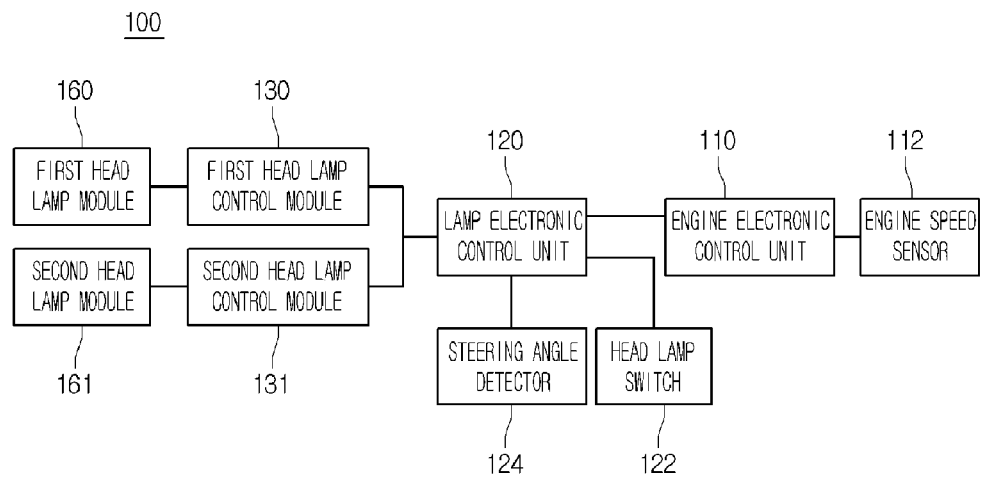
[Fig. 2]
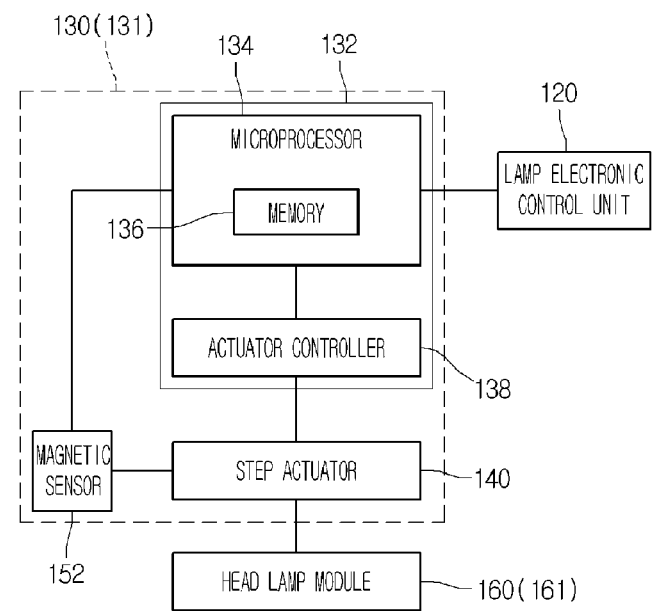
[Fig. 3]
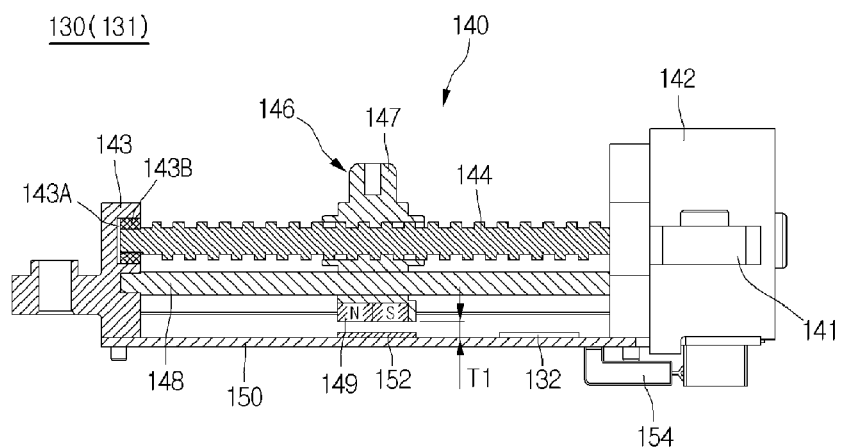

[Fig. 4]
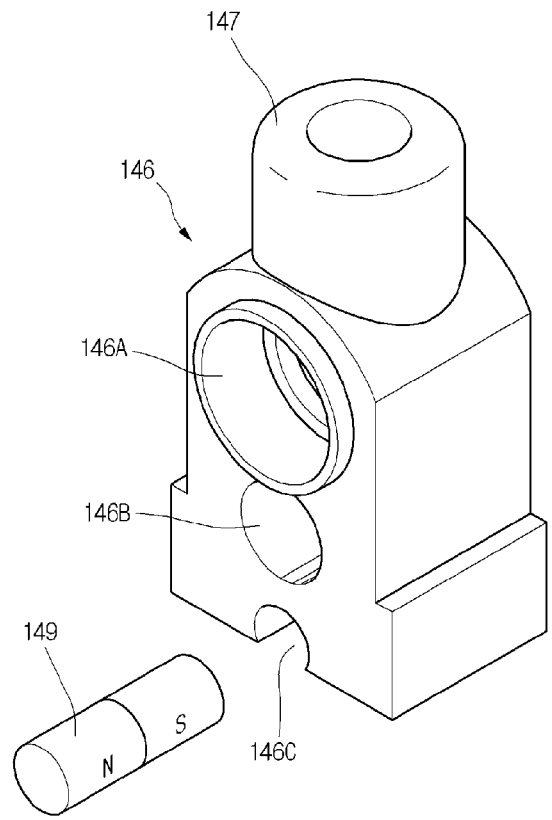
[Fig. 5]
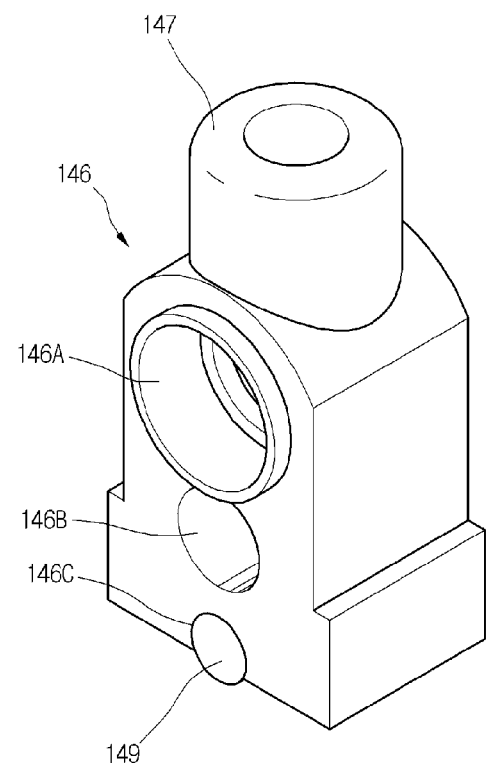

[Fig. 6]
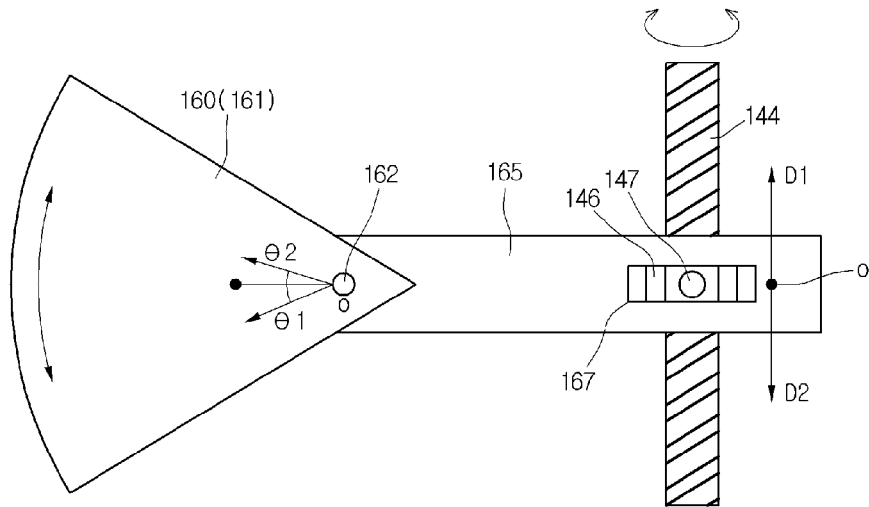
[Fig. 7]
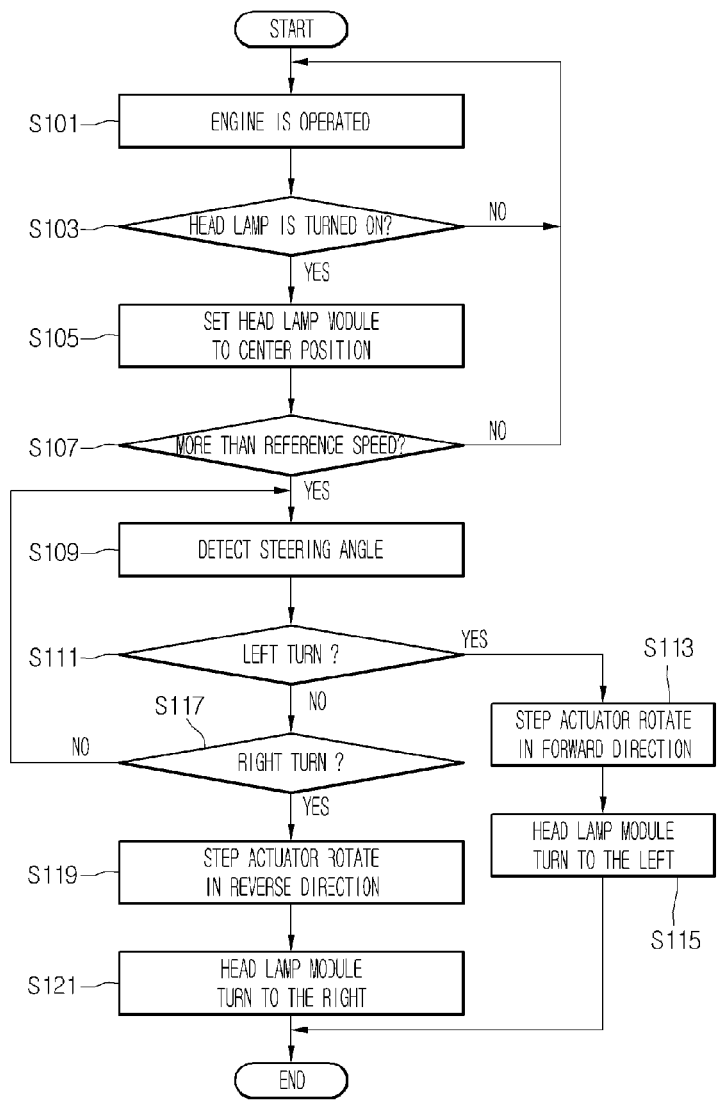

APPARATUS AND METHOD FOR CONTROLLING HEAD LAMP

CROSS-REFERENCE TO RELATED APPLICATION

This application is the U.S. national stage application of International Patent Application No. PCT/KR2008/001445, filed Mar. 14, 2008, the disclosure of which is hereby incorporated by reference in its entirety.

TECHNICAL FIELD

The embodiment relates to an apparatus and a method for controlling a head lamp.

BACKGROUND ART

A head lamp of a vehicle is an illumination lamp provided in the vehicle to irradiate light onto a road in front of the vehicle, and allows a driver to have a visual field for the road when driving at night.

Such a head lamp is fixed to the front side of a vehicle to ensure the visual field in front of the vehicle.

DISCLOSURE OF INVENTION

Technical Problem

The embodiment provides an apparatus and a method for controlling a head lamp, which can rotate a head lamp module at a predetermined angle.

The embodiment provides an apparatus and a method for controlling a head lamp, which can rotate a head lamp module in the left and right directions by converting a rotational movement of a step motor into a linear movement according to a steering direction a moving member.

The embodiment provides an apparatus and a method for controlling a head lamp, which can rotate left/right head lamp modules at various rotation angles.

Technical Solution

An embodiment provides an apparatus for controlling a head lamp comprising: a lamp electronic control unit for generating a lamp steering signal according to a received steering angle and speed information; first and second head lamp control sections for generating motor driving signals corresponding to the lamp steering signal; and first and second step actuators for rotating first and second head lamp modules at predetermined angles by converting a rotational movement of a motor into a linear movement according to the motor driving signals of the first and second head lamp control modules.

An embodiment provides an apparatus for controlling a head lamp comprising: a lamp electronic control unit for generating a lamp steering signal according to a received steering angle and speed information; first and second head lamp control modules comprising a head lamp control section for generating motor driving signals corresponding to the lamp steering signal, and a step actuator for converting a rotational movement of a motor into a linear movement according to the motor driving signals of the head lamp control section, respectively; and first and second head lamp modules turning to a left or right according to linear movements of the step actuators of the first and second head lamp control modules.

An embodiment provides a method for controlling a head lamp comprising the steps of: checking an on state of a head lamp; checking an engine speed; detecting a steering angle; generating a lamp steering signal for the steering angle if the head lamp is in an on state and the engine speed is more than a predetermined speed; generating first and second motor driving signals according to the lamp steering signal; and allowing first and second head lamp modules to turn to a left or right at a predetermined angle by converting a rotational movement of a step motor into a linear movement according to the first and second motor driving signals.

ADVANTAGEOUS EFFECTS

The embodiment can improve a visual field of a driver in a curved road by rotating a head lamp module in the direction the same as the steering direction of a moving member such as a vehicle.

The embodiment can efficiently control a head lamp module through communication between a control unit and a head lamp control module of a moving member.

The embodiment can exactly adjust rotation angles of left/right head lamp modules by converting a rotational movement of a step motor into a linear movement.

According to the embodiment, an apparatus for controlling rotation of a head lamp is prepared in the form of a module, so that a large installation space is not necessary.

The embodiment can prevent a visual field of a driver from being biased in one direction by controlling left/right head lamp modules with different angles.

BRIEF DESCRIPTION OF THE DRAWINGS

FIG. 1 is a block diagram showing the construction of a head lamp control system according to the embodiment;

FIG. 2 is a block diagram showing the detailed construction of the head lamp control module of FIG. 1;

FIG. 3 is a sectional view showing the detailed structure of the head lamp control module of FIG. 2;

FIGS. 4 and 5 are perspective views states before and after a magnet is coupled with the nut of FIG. 3;

FIG. 6 is a plan view illustrating an example of controlling a head lamp module according to the embodiment; and FIG. 7 is a flowchart illustrating a method for controlling a head lamp apparatus according to the embodiment.

BEST MODE FOR CARRYING OUT THE INVENTION

Hereinafter, an embodiment will be described with reference to accompanying drawings.

FIG. 1 is a block diagram showing the construction of a head lamp control system according to the embodiment.

Referring to FIG. 1, the head lamp control system comprises an engine electronic control unit 110, an engine speed sensor 112, a lamp electronic control unit (LECU) 120, a head lamp switch 122, a steering angle detector 124, first and second head lamp control modules 130 and 131, and first and second head lamp modules 160 and 161.

The engine electronic control unit 110 controls driving of an engine depending on the start of a moving member (e.g. vehicle), and receives the speed of the moving member from the engine speed sensor 112. The engine electronic control unit 110 transfers an engine speed to the lamp electronic control unit 120. The engine electronic control unit 110 generates speed information, which is detected when the engine speed is greater than a predetermined speed or detected in real-time, to the lamp electronic control unit 120. The speed information may comprise the engine speed values or state information representing the speed of the engine is greater than the predetermined speed.

The lamp electronic control unit 120 controls on/off of various lamps installed at the moving member. Further, the lamp electronic control unit 120 receives a steering angle of the moving member from the steering angle detector 124, and receives an on/off state of left/right head lamps from the head lamp switch 122.

The steering angle detector 124 may be installed at the shaft of a steering wheel or a wheel to detect a steering angle based on displacement caused by rotation of a steering handle. Such a steering angle detector 124 comprises an encoder mounted at the slit disk and the column tube of the shaft of the steering wheel to detect a position or a rotation angle generated according to the left/right rotation thereof.

The head lamp switch 122 may be mounted at the shaft of the steering wheel of the moving member, and is turned on/off by a driver to output an operation state signal to the lamp electronic control unit 120.

The lamp electronic control unit 120 receives desired information from each element to control each lamp using preset program. Such a lamp electronic control unit 120 may comprise a memory such as a ROM for storing predetermined program and a RAM for temporarily storing input data.

After the lamp electronic control unit 120 receives the speed information and the steering angle, the lamp electronic control unit 120 generates a lamp steering signal, which corresponds to the steering direction of the steering angle, to the first and second head lamp control modules 130 and 131 when the detected speed is greater than a reference speed. For example, when a vehicle runs at a speed of more than a predetermined speed (e.g. 70 km/h) on a road such as an express highway, the speed may be determined as the reference speed.

The first and second head lamp control modules 130 and 131 control rotation of the first and second head lamp modules 160 and 161 according to the lamp steering signal, respectively. The first and second head lamp modules 160 and 161 comprise a head lamp or a headlight, respectively. The first and second head lamp modules 160 and 161 are installed at the front left and right sides of the moving member (e.g. vehicle) to irradiate light onto the road in front of the vehicle.

The first head lamp control module 130 is connected to the first head lamp module 160 to rotate the first head lamp module 160 in the left or right direction by converting a rotational movement of a step motor into a linear movement. The second head lamp control module 131 is connected to the second head lamp module 161 to rotate the second head lamp module 161 in the right or left direction by converting a rotational movement of the step motor into a linear movement. The first head lamp control module 130 and the first head lamp module 160 are located at the left side of the vehicle, and the second head lamp control module 131 and the second head lamp module 161 are located at the right side of the vehicle.

If the moving member is steered in the left direction, the first head lamp control module 130 rotates the first head lamp module 160 by a predetermined angle in the left direction from the center position thereof. Further, the second head lamp control module 131 rotates the second head lamp module 161 by an angle less than the predetermined angle in the left direction from the center position thereof. For example, when the first head lamp module 160 rotates by 15 in the left direction about the center position, the second head lamp module 161 rotates by 7.5 in the left direction about the center position. The rotation angles of the first and second head lamp modules 160 and 161 may be changed. However, the embodiment is not limited thereto.

In contrast, if the moving member is steered in the right direction, the second head lamp control module 131 rotates the second head lamp module 161 by a predetermined angle in the right direction from the center position. Further, the first head lamp control module 130 rotates the first head lamp module 160 by an angle less than the predetermined angle in the right direction from the center position. For example, when the second head lamp module 161 rotates by 15 in the right direction about the center position, the first head lamp module 160 rotates by 7.5 in the right direction about the center position. The rotation angles of the first and second head lamp modules 160 and 161 may be changed. However, the embodiment is not limited thereto.

The first and second head lamp modules 160 and 161 rotate in the steering direction, so that the frontal visual field of a driver can be sufficiently ensured on a curved road. Further, the rotation angles of the first and second head lamp modules 160 and 161 are variously adjusted according to the steering direction, so that the visual field of a driver can be prevented from being biased in one direction.

When the inverse steering is performed, the first and second head lamp control modules 130 and 131 move the first and second head lamp modules 160 and 161 to the center position. The term inverse steering represents that the steering direction of the moving member returns to the center position in a state in which the moving member has turned to the left or right.

Further, when the lamp steering signal is not received in the first and second head lamp control modules 130 and 131 for a preset time period, the first and second head lamp control modules 130 and 131 generate a control signal for returning the first and second head lamp modules 160 and 161 to the center position.

FIG. 2 is a block diagram showing the detailed construction of the head lamp control module according to the embodiment.

Referring to FIG. 2, the first and second head lamp control modules 130 and 131 comprise a head lamp control unit 132, a step actuator 140 and a magnetic sensor 152, respectively.

The head lamp control unit 132 comprises a microprocessor 134 and an actuator controller 138, and can be prepared in the form of an IC (integrated circuit).

Such a head lamp control unit 132 receives the lamp steering signal from the lamp electronic control unit 120 and outputs a motor driving signal to the step actuator 140 according to the received lamp steering signal. The step actuator 140 controls the first and second head lamp modules 160 and 161 using the motor driving signal.

The head lamp control unit 132 communicates with the lamp electronic control unit 120 using a predetermined protocol. The communication scheme may comprise at least one of a CAN (control area network), an LIN (local interconnect network), a J1850, a MOST (media oriented systems transport), a FlexRay, a TTCAN (time triggered CAN) and a TTP/C (time triggered protocol/class C).

The microprocessor 134 comprises a memory 136 for storing program necessary for an operation of the microprocessor 134, and information on the lamp steering signal. Further, the memory 136 stores driving state information of the step actuator 140. If the microprocessor 134 is powered on, the microprocessor 134 can move the first and second head lamp modules 160 and 161 to the center position thereof by using the driving state information.

The microprocessor 134 checks the left and right steering directions according to the lamp steering signal, and then outputs a control signal to the actuator controller 138.

The actuator controller 138 converts the received control signal to a pulse signal, which is a driving signal for controlling the step actuator 140, and generates the pulse signal. The actuator controller 138 generates first and second motor driving signals. The first motor driving signal is a control signal for rotating the first head lamp module 160 by a predetermined angle in the first direction (left direction) or rotating the second head lamp module 161 by a predetermined angle in the second direction (right direction). The second motor driving signal is a control signal for rotating the first head lamp module 160 by a predetermined angle in the first direction (right direction) or rotating the second head lamp module 161 by an angle less than the predetermined angle in the second direction (left direction).

The step actuator 140 comprises a step motor or a pulse motor. The step motor rotates in the forward or reverse direction according to the motor driving signal. The step motor rotates at an angle of several ° to several tens of ° every one pulse.

The step actuator 140 rotates in the forward or reverse direction, so that the first and second head lamp modules 160 and 161 can turn to the left or right.

The magnetic sensor 152 detects variation in the center position of the step actuator 140, and transfers a detection signal to the microprocessor 134. Such a magnetic sensor 152 can be prepared in the form of a hall IC. The hall IC transfers signals, which are related to the center position of the step actuator 140, to the microprocessor 134. Accordingly, the microprocessor 134 can control the center position of the step actuator 140 according to the detection signal.

At this time, if the lamp steering signal represents the return to the center position, the microprocessor 134 moves the head lamp modules to the center position based on the signals of the magnetic sensor 152. At this time, the microprocessor 134 controls the actuator controller 138 to output third and fourth motor driving signals to the step actuator 140. The third motor driving signal is used for rotating the first head lamp module 160 or the second head lamp module 161 by a predetermined angle such that the first head lamp module 160 or the second head lamp module 161 can be directed to the center position. The fourth motor driving signal is used for rotating the first head lamp module 160 or the second head lamp module 161 by an angle less than the predetermined angle such that the first head lamp module 160 or the second head lamp module 161 can be directed to the center position.

FIG. 3 is a sectional view showing the detailed construction of the head lamp control module according to the embodiment.

Referring to FIG. 3, the first and second head lamp control modules 130 and 131 can be prepared in the form of a module on a PCB (printed circuit board) 150. Parts such as the magnetic sensor 152 and the head lamp control unit 132 are mounted on the PCB 150 and the step actuator 140 is disposed at one side of the PCB 150. Further, the PCB 150 may also comprise a power supply element and a voltage control element.

The step actuator 140 comprises a step motor section 142, a shaft support 143, a spiral rotating shaft 144, a nut 146, a guide rail 148 and a magnet 149.

The step motor section 142 of the step actuator 140 is connected to the head lamp controller 132 through a connection terminal 154 of the PCB 150.

The step motor section 142 is disposed at the other side of the PCB 150 and comprises a step motor 141. The step motor section 142 rotates in the forward or reverse direction according to the motor driving signal. The spiral rotating shaft 144 has one end coupled with the step motor 141 and the other end coupled with the shaft support 143. The spiral rotating shaft 144 rotates in the forward or reverse direction as the step motor 141 rotates in the forward or reverse direction.

The nut 146 is coupled with the spiral rotating shaft 144 to move in the axial direction (i.e. left or right direction) along the spiral rotating shaft 144. For example, if the spiral rotating shaft 144 rotates in the forward direction, the nut 146 moves in the right direction along the shaft 144. If the spiral rotating shaft 144 rotates in the reverse direction, the nut 146 moves in the left direction along the shaft 144.

The nut 146 is inserted into the guide rail 148. The guide rail 148 has one end fixed to the step motor section 142 and other end fixed to the shaft support 143. Such a guide rail 148 is disposed in parallel with the spiral rotating shaft 144 to guide movement of the nut 146. The magnet 149 is coupled with the lower portion of the nut 146. The magnet 149 has multiple polarities (e.g. N and S polarities) and moves along the nut 146. The N and S polarities may be disposed in the magnet 149 from side to side or upward and downward.

The magnetic sensor 152 is disposed at the center portion of the PCB 150 while facing the magnet 149 fixed to the nut 146. The magnet 149 may be spaced apart from the PCB 150 by an interval of 0.5 mm to 3.6 mm (T).

If the positions of the N and S polarities are changed according to movement of the magnet 149, the magnetic sensor 152 detects change of the magnetic charge in the N and S polarities. The magnetic sensor 152 can detect the center position of the nut 146 according to the strength of the magnetic charge and detect the movement direction of the nut 146 according to variation in the strength of the magnetic charge.

The center position of the nut 146 corresponds to the center position of the step actuator 140. The center position of the step actuator 140 corresponds to the center position of the head lamp module. Accordingly, the head lamp module can be adjusted to the center position.

The shaft support 143 is coupled with the other end of the spiral rotating shaft 144 and the other end of the guide rail 148. A shaft coupling groove 143A of the shaft support 143 is coupled with a bearing 143B and an elastic member, so that the other end of the spiral rotating shaft 144 can rotate. Such a shaft support 143 is fixed to the other side of the PCB 150.

FIGS. 4 and 5 are perspective views states before and after the magnet is coupled with the nut of FIG. 3.

Referring to FIGS. 4 and 5, the nut 146 comprises a link guide protrusion 147, a shaft insertion hole 146A, a rail insertion hole 146B and a magnet insertion hole 146C. The link guide protrusion 147 is formed at the upper end of the nut 146. The shaft insertion hole 146A, the rail insertion hole 146B and the magnet insertion hole 146C are formed through the side of the nut 146.

The link guide protrusion 147 is coupled with the link section 165 of FIG. 6. The shaft insertion hole 146A has a spiral shape and is coupled with the spiral rotating shaft (reference number 144 of FIG. 4). The guide rail (reference number 148 of FIG. 3) passes through the rail insertion hole 146B, and the magnet 149 is inserted into the magnet insertion hole 146C.

In FIG. 4, the N and S polarities are disposed in the magnet 149 from side to side. However, the N and S polarities may also be disposed in the magnet 149 upward and downward. Thus, the center position can be detected from the strength of magnetic charge detected by the magnetic sensor according to the structure in which the N and S polarities are disposed.

FIG. 6 is a plan view illustrating an example of controlling the head lamp module according to the embodiment.

Referring to FIG. 6, the nut 146 is coupled with the rotating shaft 144 of the step motor, the link guide protrusion 147 of the nut 146 is coupled with a guide groove 167 formed at one end of the link section 165, and the head lamp modules 160 and 161 coupled with a fixing shaft 162 are disposed at the other end of the link section 165.

As the spiral rotating shaft 144 rotates by the step motor in the forward or reverse direction, the nut 146 connected to the spiral rotating shaft 144 linearly moves in the right direction D1 or the left direction D2 which is the axial direction. One end of the link section 165 connected to the nut 146 moves in the axial direction according to the linear movement of the nut 146. The other end of the link section 165 allows the head lamp modules 160 and 161 to turn to the left or right about the fixing shaft 162. For example, as the link section 165 and the nut 146 move in the direction D1 (right direction) of the rotating shaft 144, the head lamp modules 160 and 161 turn to the left about the fixing shaft 162. Further, as the link section 165 and the nut 146 move in the direction D2 (left direction) of the rotating shaft 144, the head lamp modules 160 and 161 turn to the right about the fixing shaft 162. The head lamp modules 160 and 161 may rotate at a first angle θ1 or a second θ02 according to the steering direction of the moving member. If the first angle θ1 is 15°, the second θ2 is 7.5°. Such an angle may be varied.

Meanwhile, the rotation angles of the left/right head lamp modules 160 and 161 may be variously adjusted according to the steering direction of the moving member. For example, if the steering direction is left turn, the left head lamp module 160 may rotate at the first angle θ1 and the right head lamp module 161 may rotate at the second θ2. Further, if the steering direction is right turn, the left head lamp module 160 may rotate at the second θ2 and the right head lamp module 161 may rotate at the first angle θ1. The first angle θ1 may be set once to three times as great as the second θ2, and the difference between the first angle θ1 and the second θ2 may be varied. However, the embodiment is not limited thereto. Further, the first angle θ1 and the second θ2 may be variously set according to a vehicle model. In addition, the first angle θ1 and the second θ2 may have the same value and only one head lamp module may also rotate.

FIG. 7 is a flowchart illustrating a method for controlling the head lamp apparatus according to the embodiment.

Referring to FIG. 7, if the engine of the vehicle is operated (S101), an on/off state of the head lamp is checked (S103). If the head lamp is in an on state, the step actuator is driven such that each head lamp module can be set to the center position (S105).

Then, whether the speed of the vehicle exceeds the reference speed is determined (S107). If the speed of the vehicle exceeds the reference speed, a steering angle is detected (S109). The steering angle may also be detected in real-time according to an operation of a steering handle of the vehicle.

If the detected steering angle is left turn (S111), the step actuator rotates in the forward direction (S113). Thus, the nut coupled with the spiral rotating shaft linearly moves in the right direction along the shaft and the head lamp module connected to the nut through the link turns to the left at a predetermined angle (S115). At this time, the first head lamp module located at the left side of the vehicle turns to the left at the first angle and the second head lamp module located at the right side of the vehicle turns to the left at the second angle.

However, if the detected steering angle is right turn (S117), the step actuator rotates in the reverse direction (S119). Thus, the nut coupled with the spiral rotating shaft linearly moves in the left direction along the shaft and the head lamp module connected to the nut through the link turns to the right at a predetermined angle (S121). At this time, the first head lamp module located at the right side of the vehicle turns to the right at the first angle and the second head lamp module located at the left side of the vehicle turns to the right at the second angle.

Further, when the steering angle represents the rotation to return to the center position after the vehicle turns to the left or right, or after the vehicle rotates in the reverse direction, the head lamp control module moves the left/right head lamp modules to the center position.

Although embodiments have been described with reference to a number of illustrative embodiments thereof, it should be understood that numerous other modifications and embodiments can be devised by those skilled in the art that will fall within the spirit and scope of the principles of this disclosure.

Industrial Applicability

The embodiment can improve a visual field of a driver in a curved road by rotating a head lamp module in the direction the same as the steering direction of a moving member such as a vehicle.

The embodiment can efficiently control a head lamp module through communication between a control unit and a head lamp control module of a moving member.

The embodiment can exactly adjust rotation angles of left/right head lamp modules by converting a rotational movement of a step motor into a linear movement.

According to the embodiment, an apparatus for controlling rotation of a head lamp is prepared in the form of a module, so that a large installation space is not necessary.

The embodiment can prevent a visual field of a driver from being biased in one direction by controlling left/right head lamp modules with different angles.

The invention claimed is:

1. An apparatus for controlling a head lamp, the apparatus comprising:
    a lamp electronic control unit for generating a lamp steering signal according to a received steering angle and speed information;
    first and second head lamp control sections for generating motor driving signals corresponding to the lamp steering signal; and
    first and second step actuators for rotating first and second head lamp modules at predetermined angles by converting a rotational movement of a motor into a linear movement according to the motor driving signals of the first and second head lamp control modules,
    wherein the first and second step actuators comprise:
    a step motor;
    a spiral rotating shaft connected to the step motor; and
    a nut that linearly moves in an axial direction as the spiral rotating shaft rotates in a forward or reverse direction.

2. The apparatus as claimed in claim 1, wherein the lamp electronic control unit generates the lamp steering signal for a steering direction of the steering angle if a head lamp is in an on state and an engine speed is a movement speed of more than a predetermined speed.

3. The apparatus as claimed in claim 1, comprising:
    a head lamp switch for outputting an on/off state of the head lamp to the lamp electronic control unit;
    a steering angle detector for detecting an steering angle of a steering handle to output a detection signal to the lamp electronic control unit; and an engine electronic control unit for outputting an engine speed to the lamp electronic control unit.

4. The apparatus as claimed in claim 1, wherein the first and second head lamp control modules and the lamp electronic control unit use at least one of a CAN (control area network), an LIN (local interconnect network), a J1850, a MOST (media oriented systems transport), a FlexRay, a TTCAN (time triggered CAN) and a TTP/C (time triggered protocol/class C).

5. The apparatus as claimed in claim 1, wherein the first step actuator rotates the first head lamp module in a first direction by a predetermined angle if the lamp steering signal is a lamp steering signal in the first direction, and rotates the first head lamp module in a second direction by an angle less than the predetermined angle if the lamp steering signal is a lamp steering signal in the second direction.

6. The apparatus as claimed in claim 1, wherein the second step actuator rotates the second head lamp module in a second direction by a predetermined angle if the lamp steering signal is a lamp steering signal in the second direction, and rotates the second head lamp module in a first direction by an angle less than the predetermined angle if the lamp steering signal is a lamp steering signal in the first direction.

7. The apparatus as claimed in claim 1, comprising a link section having a first end coupled with the nut and a second end coupled with one end of the head lamp module through a fixing shaft such that the link section rotates about the fixing shaft.

8. The apparatus as claimed in claim 1, the first and second step actuators comprise a guide rail that guides linear movement of the nut.

9. The apparatus as claimed in claim 1, comprising:
a magnet having multiple polarities and fixed to the nut; and
a magnetic sensor that detects change of magnetic charge of the magnet to output a detection signal to the head lamp control section.

10. The apparatus as claimed in claim 1, wherein the head lamp control section controls the first and second step actuators such that the first and second head lamp modules return to a center position if the lamp steering signal is reversed.

11. An apparatus for controlling a head lamp, the apparatus comprising:
a lamp electronic control unit for generating a lamp steering signal according to a received steering angle and speed information;
first and second head lamp control modules comprising a head lamp control section for generating motor driving signals corresponding to the lamp steering signal, and a step actuator for converting a rotational movement of a motor into a linear movement according to the motor driving signals of the head lamp control section; and
first and second head lamp modules turning to the left or right according to linear movements of the step actuators of the first and second head lamp control modules,
wherein the step actuator comprises:
a step motor;
a spiral rotating shaft connected to the step motor; and
a nut that linearly moves in an axial direction as the spiral rotating shaft rotates in a forward or reverse direction.

12. The apparatus as claimed in claim 11, comprising a link section having a first end coupled with the nut of the step actuator, and a second end coupled through a shaft with one end of each of the first and second head lamp modules.

13. The apparatus as claimed in claim 11, wherein the steering angle uses information detected from at least one of a steering wheel shaft or a wheel.

14. The apparatus as claimed in claim 11, comprising a magnet and a magnetic sensor that detect change of magnetic charge of the step actuator to transfer a detection signal to the head lamp control section, in which the head lamp control section moves the step actuator to a center position by using the detection signal received from the magnetic sensor.

15. The apparatus as claimed in claim 11, wherein the head lamp control section comprising:
a microprocessor for receiving the lamp steering signal to output a driving signal; and
an actuator controller for converting the driving signal of the microprocessor to a pulse signal and outputting the pulse signal to the step actuator.

16. A method for controlling a head lamp, the method comprising the steps of:
checking an on state of a head lamp;
checking an engine speed;
detecting a steering angle;
generating a lamp steering signal for the steering angle if the head lamp is in an on state and the engine speed is more than a predetermined speed;
generating first and second motor driving signals according to the lamp steering signal; and
allowing first and second head lamp modules to turn to the left or right at a predetermined angle by converting a rotational movement of a step motor into a linear movement according to the first and second motor driving signals,
wherein the step motor includes:
a spiral rotating shaft connected to the step motor; and
a nut that linearly moves in an axial direction as the spiral rotating shaft rotates in a forward or reverse direction.

17. The method as claimed in claim 16, wherein the first and second head lamp modules rotate in a left or right direction at a predetermined angle according to the first motor driving signal, and rotate in a left or right direction at an angle less than the predetermined angle according to the second motor driving signal.

18. The method as claimed in claim 16, comprising a step of generating third and fourth motor driving signals for returning the first and second head lamp modules to a center position if the lamp steering signal for the steering angle is reversed.

* * * * *